US011993747B1

United States Patent
Al-Yousif et al.

(10) Patent No.: US 11,993,747 B1
(45) Date of Patent: May 28, 2024

(54) TREATMENT OF SUBTERRANEAN FORMATIONS

(71) Applicant: Saudi Arabian Oil Company, Dhahran (SA)

(72) Inventors: Zuhair Al-Yousif, Saihat (SA); Abdulaziz S. Al-Qasim, Dammam (SA); Shaohua Chen, Beijing (CN); Tianping Huang, Beijing (CN); Ming Han, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/178,979

(22) Filed: Mar. 6, 2023

(51) Int. Cl.
| | |
|---|---|
| *E21B 43/34* | (2006.01) |
| *C09K 8/584* | (2006.01) |
| *C09K 8/594* | (2006.01) |
| *C09K 23/04* | (2022.01) |
| *C09K 23/08* | (2022.01) |

(52) U.S. Cl.
CPC ............ *C09K 8/594* (2013.01); *C09K 8/584* (2013.01); *C09K 23/04* (2022.01); *C09K 23/08* (2022.01)

(58) Field of Classification Search
CPC .......... C09K 8/594; C09K 8/584; E21B 43/34
USPC ....................................................... 166/270.1
See application file for complete search history.

(56) References Cited

U.S. PATENT DOCUMENTS

| | | | | |
|---|---|---|---|---|
| 9,862,882 | B2* | 1/2018 | Huang | C09K 8/86 |
| 2010/0048432 | A1* | 2/2010 | Costello | C09K 8/584 |
| | | | | 507/224 |
| 2016/0257879 | A1* | 9/2016 | Huang | C09K 8/94 |
| 2019/0330518 | A1 | 10/2019 | Dai et al. | |
| 2020/0131431 | A1* | 4/2020 | Russum | C09K 8/74 |
| 2022/0204835 | A1* | 6/2022 | Nguyen | C09K 8/584 |

OTHER PUBLICATIONS

AlYousef et al., "Direct Thickening of Supercritical Carbon Dioxide Using $CO_2$-SolublePolymer," presented at the Abu Dhabi International Petroleum Exhibition & Conference, Abu Dhabi, UAE, Nov. 11-14, 2019, 11 pages.
Carpenter, "Development of Small Molecule $CO_2$ Thickeners," Journal of Petroleum Technology, Jul. 2014, 3 pages.
Gizzatov et al., "High-Temperature High-Pressure Microfluidic System for Rapid Screening of Supercritical $CO_2$ Foaming Agents," Scientific Reports, Feb. 2021, 13 pages.
Heller et al., "Direct Thickeners for Mobility Control of $CO_2$ Floods," Society of Petroleum Engineers Journal, Oct. 1985, 8 pages.
Lee et al., "Development of Small Molecule $CO_2$ Thickeners for EOR and Fracturing," presented at the SPE Improved Oil Recovery Symposium, Tulsa, Oklahoma, Apr. 12-14, 2014, 18 pages.

(Continued)

*Primary Examiner* — Zakiya W Bates
*Assistant Examiner* — Ashish K Varma
(74) *Attorney, Agent, or Firm* — Fish & Richardson P.C.

(57) ABSTRACT

The present disclosure relates to methods for treating a water zone of a subterranean formation by injecting a mixture including an anionic surfactant and an amine, followed by $CO_2$, to reduce water production from the formation.

25 Claims, 4 Drawing Sheets

(56) References Cited

OTHER PUBLICATIONS

Li et al., "$CO_2$-Triggered Gelation for Mobility Control and Channeling Blocking During $CO_2$ Flooding Processes," Petroleum Science, May 2016, 13:247-58, 11 pages.
Li et al., "Leakage Mitigation During $CO_2$ Geological Storage Process Using $CO_2$ Triggered Gelation," Industrial & Engineering Chemical Research, Feb. 2019, 58(8):3395-406, 2 pages.
Massarweh et al., "A Review of Recent Developments in $CO_2$ Mobility Control in Enhanced Oil Recovery," Petroleum, May 2021, 8:291-317, 27 pages.
Syed et al., "The Use of Polymer-Gel Solutions for Remediation of Potential $CO_2$ Leakage from Storage Reservoirs," Energy Procedia, Jan. 2014, 8 pages.

* cited by examiner

TREATMENT OF SUBTERRANEAN FORMATIONS

TECHNICAL FIELD

The present disclosure relates to methods for treating a water zone of a subterranean formation by injecting a mixture including an anionic surfactant and an amine, followed by $CO_2$, to reduce water production from the formation.

BACKGROUND

A wellbore may be drilled into a subterranean formation for the exploration or production of crude oil and natural gas. An example of a problematic section of a wellbore is a water zone in which water enters the wellbore from the subterranean formation or underlying water aquifer. The influx of water into the wellbore during drilling and during the subsequent production of oil and gas can cause operational difficulties including surface and subsurface corrosion of tubing and pipes, fines migration, and accelerated well abandonment. The production of water along with the oil and gas from the subterranean formation can necessitate surface processing and injection of the produced water back into the formation, for disposal or pressure maintenance. Such processing and injection of water from the water zone causes increased costs of the oil and gas production.

Therefore, there is a need for methods to reduce water production from subterranean formations.

SUMMARY

Provided in the present disclosure is a method of treating a water zone of a subterranean formation. The method includes injecting, through a wellbore into the water zone, a mixture including an anionic surfactant and an amine and having a viscosity of less than about 0.01 Pa·s at a shear rate from about 0.1 to about 1000 s$^{-1}$, and then injecting CO2 through the wellbore into the water zone to increase a viscosity of the mixture in the water zone. Increasing the viscosity of the mixture reduces an influx of water from the water zone into the wellbore.

In some embodiments, the anionic surfactant includes a carboxylate surfactant, a sulfonate surfactant, a sulfate surfactant, or any combination thereof. In some embodiments, the anionic surfactant includes an alkyl group, alkenyl group, or an alkyl alcohol ether group. In some embodiments, the alkyl group includes a $C_{12-22}$ alkyl group. In some embodiments, the alkyl group includes a $C_{12-22}$ alkenyl group. In some embodiments, the alkyl alcohol ether group includes a $C_{12-22}$ alkyl alcohol polyoxyethylene group.

In some embodiments, the anionic surfactant includes a compound of Formula I, Formula II, or Formula III:

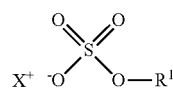
(I)

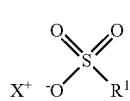
(II)

(III)

wherein:
R$^1$ is

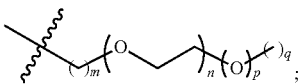

the sum of m and q is an integer from 12 to 22;
n is an integer from 0 to 10;
p is 0 or 1; and
X$^+$ is Li$^+$, Na$^+$, K$^+$, Cs$^+$, Ag$^+$, or (R$^A$)$_4$N$^+$, wherein
  each occurrence of R A is selected from H, $C_{1-6}$ alkyl, $C_{3-6}$ cycloalkyl, 4- to 7-membered heterocycloalkyl, $C_{6-10}$ aryl, and 5- to 10-membered heteroaryl;
  each $C_{1-6}$ alkyl is optionally substituted with 1-3 R$^B$ independently selected from $C_{3-6}$ cycloalkyl, 4- to 7-membered heterocycloalkyl, $C_{6-10}$ aryl, and 5- to 10-membered heteroaryl; and
  optionally, one or more instances of R A are taken together with the nitrogen atom to which they are attached to form a 4- to 7-membered heterocycloalkyl.

In some embodiments of Formula I, Formula II, or Formula III, n is from 1 to 10, and p is 1. In some embodiments of Formula I, Formula II, or Formula III, n, p, and q are each 0.

In some embodiments, the anionic surfactant includes sodium dodecyl sulfate, sodium tetradecyl sulfate, sodium hexadecyl sulfate, sodium octadecyl sulfate, or any combination thereof.

In some embodiments, the amine includes an alkylene diamine, alkylene triamine, alkanolamine, or any combination thereof.

In some embodiments, the amine includes a compound of Formula IV:

(IV)

wherein
R$^2$ is selected from $C_{1-}$ alkyl, $C_{3-6}$ cycloalkyl, 4- to 7-membered heterocycloalkyl, $C_{6-10}$ aryl, and 5- to 10-membered heteroaryl;
R$^3$ and R$^4$ are each independently selected from —H, $C_{1-6}$ alkyl, $C_{3-6}$ cycloalkyl, 4- to 7-membered heterocycloalkyl, $C_{6-10}$ aryl, and 5- to 10-membered heteroaryl;
each $C_{1-6}$ alkyl and $C_{6-10}$ aryl is optionally substituted with 1-3 R$^C$;
each R$^C$ is independently selected from —OH and —N(R$^D$)$_2$; and
each R$^D$ is independently selected from —H and $C_{1-4}$ alkyl.

In some embodiments of Formula IV, R$^2$ is $C_{1-6}$ alkyl or phenyl, R$^3$ and R$^4$ are each independently selected from —H, $C_{1-6}$ alkyl, and phenyl, and each $R^C$ is independently selected from —OH and —$NH_2$.

In some embodiments, the amine includes diethylene triamine, bis(hexamethylene) triamine, 2-(dimethylamino) ethanol, or any combination thereof.

In some embodiments, the anionic surfactant and the amine are present in the mixture in a molar ratio of about 5:1 to about 1:5. In some embodiments, the anionic surfactant and the amine are present in the mixture in a molar ratio of about 2:1 to about 1:2.

In some embodiments, a total concentration of the anionic surfactant and the amine in the water zone after injecting the mixture is about 0.01 mol/L to about 2 mol/L. In some embodiments, a total concentration of the anionic surfactant and the amine in the water zone after injecting the mixture is about 0.1 mol/L to about 0.75 mol/L.

In some embodiments, the viscosity of the mixture before injecting $CO_2$ is less than about 0.005 Pa·s at a shear rate from about 0.1 to about 1000 $s^{-1}$. In some embodiments, injecting $CO_2$ increases the viscosity of the mixture in the water zone to greater than about 0.01 Pa·s at a shear rate from about 0.1 to about 1000 $s^{-1}$.

In some embodiments, the water zone includes a fracture or high-permeability streak.

In some embodiments, the method further includes isolating the water zone before injecting the mixture. In some embodiments, isolating the water zone includes deploying a straddle packer into the wellbore.

Also provided in the present disclosure is a method of treating a water zone of a subterranean formation. The method includes deploying a straddle packer into a wellbore in the subterranean formation, and expanding an upper seal of the straddle packer above the water zone and expanding a lower seal of the straddle packer below the water zone to mechanically isolate the water zone. The method includes injecting a mixture including an anionic surfactant and an amine through the straddle packer into the water zone, and then injecting $CO_2$ through the wellbore into the water zone to increase a viscosity of the mixture in the water zone.

In some embodiments, the method further includes removing the straddle packer from the wellbore after injecting $CO_2$.

DETAILED DESCRIPTION

Figure 1:
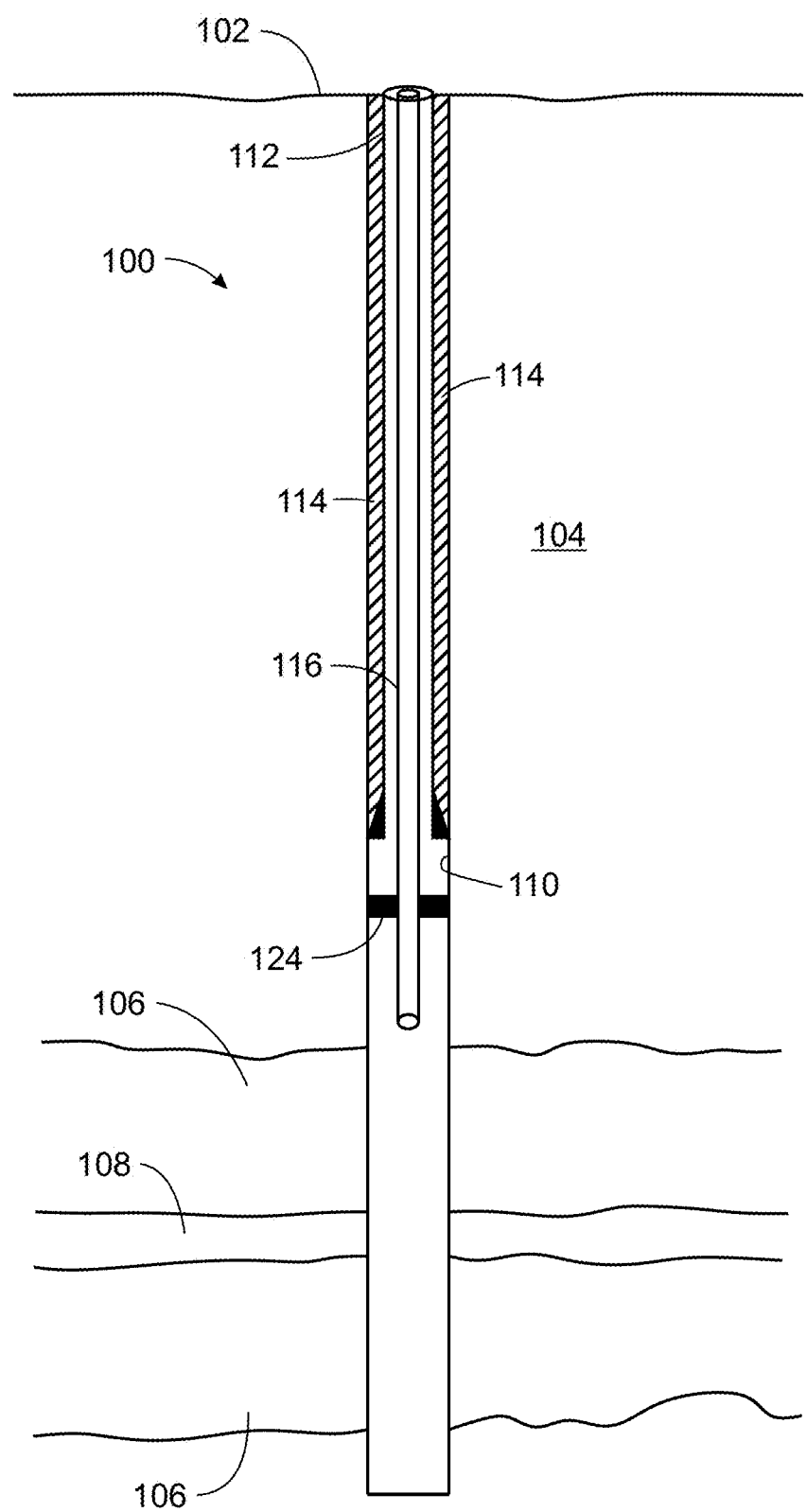
FIG. 1 is a schematic illustration of a wellbore formed through the earth surface into a subterranean formation.

The present disclosure relates to methods for treating a water zone of a subterranean formation by injecting a low-viscosity mixture including an anionic surfactant and an amine through a wellbore into the water zone, and then injecting $CO_2$ through the wellbore into the water zone. Injecting the $CO_2$ can trigger gelation of the mixture in the water zone. The increased viscosity of the mixture after $CO_2$ injection can reduce or even block influx of water from the water zone into the wellbore, reducing or eliminating operational difficulties associated with high water production from a subterranean formation. Because injected $CO_2$ can be sequestered in the gelled mixture, the methods described in the present disclosure can also reduce atmospheric $CO_2$.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

The terms "a," "an," and "the" are used in the present disclosure to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used in the present disclosure, the term "about" can allow for a degree of variability in a value or range, for example, within 10%, within 5%, or within 1% of a stated value or of a stated limit of a range.

In the methods of the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "substituted" means that an atom or group of atoms formally replaces hydrogen as a "substituent" attached to another group. The term "substituted", unless otherwise indicated, refers to any level of substitution, for example, mono-, di-, tri-, tetra- or penta-substitution, where such substitution is permitted. The substituents are independently selected, and substitution may be at any chemically accessible position. It is to be understood that substitution at a given atom is limited by valency. It is to be understood that substitution at a given atom results in a chemically stable molecule. The phrase "optionally substituted" means unsubstituted or substituted. The term "substituted" means that a hydrogen atom is removed and replaced by a substituent. A single divalent substituent, for example, oxo, can replace two hydrogen atoms.

As used in the present disclosure, the term "Cn-m" indicates a range which includes the endpoints, wherein n and m are integers and indicate the number of carbons. Examples include $C_{1-4}$, $C_{1-6}$ and the like.

As used in the present disclosure, the term "n-membered," where n is an integer, indicates the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring and 1,2,3,4-tetrahydro-naphthalene is an example of a 10-membered cycloalkyl group.

As used in the present disclosure, the term "alkyl" refers to a saturated hydrocarbon group that may be straight-chained or branched. In some embodiments, the alkyl group contains from 1 to 6 carbon atoms, from 1 to 4 carbon atoms, from 1 to 3 carbon atoms, or 1 to 2 carbon atoms. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like.

As used in the present disclosure, the term "alkylene," refers to a divalent alkyl linking group. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl and the like.

As used in the present disclosure, the term "alkenyl," refers to a straight-chain or branched hydrocarbon group corresponding to an alkyl group having one or more double carbon-carbon bonds. In some embodiments, the alkenyl moiety contains 2 to 6, 2 to 4, or 2 to 3 carbon atoms. Example alkenyl groups include, but are not limited to, ethenyl, n-propenyl, isopropenyl, n-butenyl, sec-butenyl and the like.

As used in the present disclosure, the term "cycloalkyl" refers to a non-aromatic hydrocarbon ring system (monocyclic, bicyclic or polycyclic), including cyclized alkyl and alkenyl groups. Cycloalkyl groups can include mono- or polycyclic (for example, having 2, 3 or 4 fused rings) groups and spirocycles. Cycloalkyl groups can have 3, 4, 5, 6 or 7 ring-forming carbons ($C_{3-7}$). In some embodiments, the cycloalkyl group has 3 to 6 ring members, 3 to 5 ring members, or 3 to 4 ring members. In some embodiments, the cycloalkyl group is monocyclic. In some embodiments, the cycloalkyl group is monocyclic or bicyclic. In some embodiments, the cycloalkyl group is a $C_{3-6}$ monocyclic cycloalkyl group. Ring-forming carbon atoms of a cycloalkyl group can be optionally oxidized to form an oxo or sulfido group. Cycloalkyl groups also include cycloalkylidenes. In some embodiments, cycloalkyl is cyclopropyl, cyclobutyl, cyclopentyl or cyclohexyl. Also included in the definition of cycloalkyl are moieties that have one or more aromatic rings fused (having a bond in common with) to the cycloalkyl ring, for example, benzo or thienyl derivatives of cyclopentane, cyclohexane and the like. A cycloalkyl group containing a fused aromatic ring can be attached through any ring-forming atom including a ring-forming atom of the fused aromatic ring. Examples of cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, bicyclo[1.1.1]pentanyl, bicyclo[2.1.1]hexanyl, and the like. In some embodiments, the cycloalkyl group is cyclopropyl, cyclobutyl, cyclopentyl, or cyclohexyl.

As used in the present disclosure, the term "Cn-m aryl" refers to an aryl group having from n to m ring carbon atoms. Aryl groups include phenyl, naphthyl, indanyl, indenyl, and the like. In some embodiments, aryl groups have from 6 to 10 carbon atoms. In some embodiments, aryl groups have 6 carbon atoms. In some embodiments aryl groups have 10 carbon atoms. In some embodiments, the aryl group is phenyl. In some embodiments, the aryl group is naphthyl.

The term "heterocycloalkyl," employed alone or in combination with other terms, refers to a non-aromatic ring or ring system, which may optionally contain one or more alkenylene groups as part of the ring structure, which has at least one heteroatom ring member independently selected from nitrogen, sulfur oxygen and phosphorus, and which has 4-10 ring members, 4-7 ring members, or 4-6 ring members. Included within the term "heterocycloalkyl" are monocyclic 4-, 5-, 6- and 7-membered heterocycloalkyl groups. Heterocycloalkyl groups can include mono- or bicyclic (for example, having two fused or bridged rings) ring systems. In some embodiments, the heterocycloalkyl group is a monocyclic group having 1, 2 or 3 heteroatoms independently selected from nitrogen, sulfur and oxygen. Ring-forming carbon atoms and heteroatoms of a heterocycloalkyl group can be optionally oxidized to form an oxo or sulfido group or other oxidized linkage (for example, C(O), S(O), C(S) or $S(O)_2$, N-oxide etc.) or a nitrogen atom can be quaternized. The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (having a bond in common with) to the heterocycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. Examples of heterocycloalkyl groups include azetidinyl, azepanyl, dihydrobenzofuranyl, dihydrofuranyl, dihydropyranyl, morpholino, 3-oxa-9-azaspiro[5.5]undecanyl, 1-oxa-8-azaspiro[4.5]decanyl, piperidinyl, piperazinyl, oxopiperazinyl, pyranyl, pyrrolidinyl, quinuclidinyl, tetrahydrofuranyl, tetrahydropyranyl, 1,2,3,4-tetrahydroquinolinyl, tropanyl, and thiomorpholino.

As used in the present disclosure, the term "heteroaryl" refers to a monocyclic or polycyclic aromatic heterocycle having at least one heteroatom ring member selected from sulfur, oxygen and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl has 5-14 ring atoms including carbon atoms and 1, 2, 3, or 4 heteroatom ring members independently selected from nitrogen, sulfur and oxygen. In some embodiments, the heteroaryl has 5-10 ring atoms including carbon atoms and 1, 2, 3, or 4 heteroatom ring members independently selected from nitrogen, sulfur and oxygen. In some embodiments, the heteroaryl has 5-6 ring atoms and 1 or 2 heteroatom ring members independently selected from nitrogen, sulfur and oxygen. In some embodiments, the heteroaryl is a five-membered or six-membered heteroaryl ring. In other embodiments, the heteroaryl is an eight-membered, nine-membered or ten-membered fused bicyclic heteroaryl ring. Example heteroaryl groups include, but are not limited to, pyridinyl (pyridyl), pyrimidinyl, pyrazinyl, pyridazinyl, pyrrolyl, pyrazolyl, azolyl, oxazolyl, thiazolyl, imidazolyl, furanyl, thiophenyl, quinolinyl, isoquinolinyl, naphthyridinyl (including 1,2-, 1,3-, 1,4-, 1,5-, 1,6-, 1,7-, 1,8-, 2,3- and 2,6-naphthyridine), indolyl, benzothiophenyl, benzofuranyl, benzisoxazolyl, imidazo[1,2-b]thiazolyl, purinyl, and the like.

The term "n-membered," where n is an integer, typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring and 1,2,3,4-tetrahydro-naphthalene is an example of a 10-membered cycloalkyl group.

As used in the present disclosure, the term "halo" refers to —F, —Cl, —Br, or -.

As used in the present disclosure, the term "hydroxyl" refers to —OH.

As used in the present disclosure, the term "amino" refers to —$NR^{N1}R^{N2}$, where each of $R^{N1}$ and $R^{N2}$ is independently H or $C_{1-4}$ alkyl.

As used in the present disclosure, the term "thiol" refers to —SH.

As used in the present disclosure, the term "oxo" refers to =O.

As used in the present disclosure, the term "carboxylate surfactant" refers to a compound having the formula R—C(O)$O^-$ $X^+$, in which R is a hydrophobic group and $X^+$ is a cationic moiety having a formal charge of 1. For example, R can be an alkyl group.

As used in the present disclosure, the term "sulfate surfactant" refers to a compound having the formula R—OS(O)$_2$$O^-$ $X^+$, in which R is a hydrophobic group and $X^+$ is a cationic moiety having a formal charge of 1. For example, R can be an alkyl group.

As used in the present disclosure, the term "sulfonate surfactant" refers to a compound having the formula R—S(O)$_2$$O^-$ $X^+$, in which R is a hydrophobic group and $X^+$ is a cationic moiety having a formal charge of 1. For example, R can be an alkyl group.

As used in the present disclosure, the term "alkyl alcohol ether" refers to a hydrophobic group having the formula $R^1$—O—($R^2$—O)$_n$—, in which $R^1$ and $R^2$ are alkyl and n is an integer of 1 or greater. For example, the alkyl alcohol ether can be an alkyl alcohol polyoxyethylene group, where $R^2$ is $C_2$ alkyl.

As used in the present disclosure, the term "alkylene diamine" refers to a compound including two amino groups linked by an alkylene group. For example, the alkylene group can be a $C_2$ alkylene group.

As used in the present disclosure, the term "alkylene triamine" refers to a compound including three amino groups linked by two alkylene groups. In some embodiments, the alkylene groups are the same. For example, the alkylene group can be a $C_6$ alkylene group.

As used in the present disclosure, the term "alkanolamine" refers to a compound including an amino group and a hydroxyl group linked by an alkylene group. For example, the alkylene group can be a $C_2$ alkylene group.

As used in the present disclosure, the term "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Injecting a material in a subterranean formation can include contacting the material with any section of a wellbore or with any subterranean region in fluid contact therewith. Subterranean materials can include any materials placed into the wellbore such as cement, drill shafts, liners, tubing, casing, or screens; injecting a material in a subterranean formation can include contacting with such subterranean materials. In some examples, a subterranean formation or material can be any below-ground region that can produce liquid or gaseous petroleum materials, water, or any section below-ground in fluid contact therewith.

As used in the present disclosure, the term "water zone" refers to a water-producing region of a subterranean formation. Water zones of a subterranean formation include fractures or high-permeability zones that allow water to enter a wellbore from the subterranean formation. Water zones can be identified, for example, based on a water content of the total produced fluids from a well bore. In some embodiments, a water content of total produced fluids from a wellbore of 90% or more indicates the presence of a water zone. Water zones including fractures can also be identified, for example, using specialized testing tools such as logging tools or subsurface pressure testing methods.

Anionic Surfactant

The methods of the present disclosure including injecting a mixture including an anionic surfactant through a wellbore into a water zone. In some embodiments, the anionic surfactant includes a carboxylate surfactant, a sulfonate surfactant, a sulfate surfactant, or any combination thereof.

In some embodiments, the anionic surfactant includes an alkyl group or an alkenyl group. In some embodiments, the anionic surfactant includes a $C_{12-22}$ alkyl group or a $C_{12-22}$ alkenyl group. In certain such embodiments, the anionic surfactant includes a $C_{12}$, $C_{14}$, $C_{16}$, $C_{18}$, $C_{20}$, or $C_{22}$ alkyl group, or a $C_{12}$, $C_{14}$, $C_{16}$, $C_{18}$, $C_{20}$, or $C_{22}$ alkenyl group. In some embodiments, the anionic surfactant includes a sulfate surfactant including a $C_{12-22}$ alkyl group. For example, in some embodiments, the anionic surfactant includes sodium dodecyl sulfate, sodium tetradecyl sulfate, sodium hexadecyl sulfate, sodium octadecyl sulfate, or any combination thereof.

In some embodiments, the anionic surfactant includes an alkyl alcohol ether group. In some embodiments, the anionic surfactant includes an alkyl alcohol polyoxyethylene group. In certain such embodiments, the anionic surfactant includes a $C_{12-22}$ alkyl alcohol polyoxyethylene group. In some embodiments, the alkyl alcohol polyoxyethylene group has a degree of ethoxylation from about 0.5 to about 10, for example, from about 0.5 to about 7, or from about 1 to about 5.

In some embodiments, the anionic surfactant includes a compound of Formula I, Formula II, or Formula III:

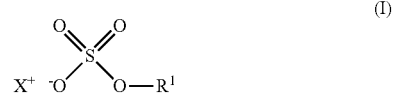

(I)

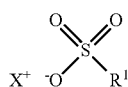

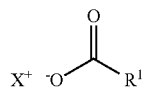

wherein:

R¹ is

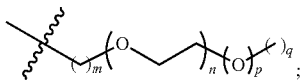

the sum of m and q is an integer from 12 to 22;

n is an integer from 0 to 10;

p is 0 or 1; and $X^+$ is $Li^+$, $Na^+$, $K^+$, $Cs^+$, $Ag^+$, or $(R^A)_4N^+$, wherein each occurrence of R A is selected from H, $C_{1-6}$ alkyl, $C_{3-6}$ cycloalkyl, 4- to 7-membered heterocycloalkyl, $C_{6-10}$ aryl, and 5- to 10-membered heteroaryl;

each $C_{1-6}$ alkyl is optionally substituted with 1-3 $R^B$ independently selected from $C_{3-6}$ cycloalkyl, 4- to 7-membered heterocycloalkyl, $C_{6-10}$ aryl, and 5- to 10-membered heteroaryl; and optionally, one or more instances of R A are taken together with the nitrogen atom to which they are attached to form a 4- to 7-membered heterocycloalkyl.

In some embodiments, the anionic surfactant includes a compound of Formula I. In some embodiments, the anionic surfactant includes a compound of Formula II. In some embodiments, the anionic surfactant includes a compound of Formula III.

In some embodiments, n, p, and q are each 0. In certain such embodiments, m is 12, 14, 16, 18, 20, or 22.

In some embodiments, n is from 1 to 10, and p is 1. In certain such embodiments, n is from 1 to 7, from 1 to 5, or from 1 to 3. In certain such embodiments, m is from 1 to 5, or from 1 to 3. In certain such embodiments, q is 10, 12, 14, 16, or 18.

Amine

The methods of the present disclosure including injecting a mixture including an amine through a wellbore into a water zone. In some embodiments, the amine includes an alkylene diamine, alkylene triamine, alkanolamine, or any combination thereof. In certain such embodiments, the alkylene diamine, alkylene triamine, or alkanolamine include a $C_2$-$C_6$ alkylene group. For example, in some embodiments, the amine includes diethylene triamine, bis(hexamethylene) triamine, 2-(dimethylamine) ethanol, or any combination thereof.

In some embodiments, the amine includes a compound of Formula IV:

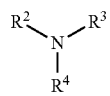

wherein $R^2$ is selected from $C_{1-6}$ alkyl, $C_{3-6}$ cycloalkyl, 4- to 7-membered heterocycloalkyl, $C_{6-10}$ aryl, and 5- to 10-membered heteroaryl;

$R^3$ and $R^4$ are each independently selected from —H, $C_{1-6}$ alkyl, $C_{3-6}$ cycloalkyl, 4- to 7-membered heterocycloalkyl, $C_{6-10}$ aryl, and 5- to 10-membered heteroaryl;

each $C_{1-6}$ alkyl and $C_{6-10}$ aryl is optionally substituted with 1-3 $R^C$;

each $R^C$ is independently selected from —OH and —N($R^D$)$_2$; and each $R^D$ is independently selected from —H and $C_{1-4}$ alkyl.

In some embodiments, $R^2$ is $C_{1-6}$ alkyl or phenyl. In some embodiments, $R^3$ and $R^4$ are each independently selected from —H, $C_{1-6}$ alkyl, and phenyl. In some embodiments, each R c is independently selected from —OH and —NH$_2$.

Mixture

The methods of the present disclosure including injecting a mixture including an anionic surfactant and an amine through a wellbore into a water zone. The anionic surfactant can be any anionic surfactant of the present disclosure. The amine can be any amine of the present disclosure. For example, in some embodiments, the mixture includes one or more anionic surfactants selected from sodium dodecyl sulfate, sodium tetradecyl sulfate, sodium hexadecyl sulfate, and sodium octadecyl sulfate, and one or more amines selected from diethylene triamine, bis(hexamethylene) triamine, and 2-(dimethylamino) ethanol.

In some embodiments, the anionic surfactant and the amine are present in the mixture in a molar ratio of about 5:1 to about 1:5, for example, about 5:1 to about 1:3, about 5:1 to about 1:2, about 5:1 to about 1:1, about 3:1 to about 1:5, about 3:1 to about 1:3, about 3:1 to about 1:2, about 3:1 to about 1:1, about 2:1 to about 1:5, about 2:1 to about 1:3, about 2:1 to about 1:2, about 2:1 to about 1:1. In some embodiments, the anionic surfactant and the amine are present in the mixture in a molar ratio of about 3:1, about 2:1, about 1:1, about 1:2, or about 1:3.

In some embodiments, the mixture before injecting through the wellbore includes water. The amount of water present in the mixture before injecting can be selected to provide a desired concentration of the anionic surfactant and the amine in the water zone after injecting the mixture. For example, an appropriate amount of a concentrated mixture can be injected into a water zone to provide, upon dilution with water present in the water zone, a desired concentration of the anionic surfactant and the amine in the water zone. Such amounts can be optimized for a given water zone, for example, using software.

Treatment Methods

The methods of the present disclosure including injecting a mixture including an anionic surfactant and an amine through a wellbore into a water zone, and then injecting $CO_2$ through the wellbore into the water zone to increase a viscosity of the mixture in the water zone. FIG. 1 is a schematic illustration of a wellbore 100 formed through the earth surface 102 into a subterranean formation 104. The subterranean formation includes hydrocarbon reservoir formations 106 and an intervening water zone 108. Water may enter the wellbore 400 from the water zone 108. An inner surface of the wellbore 100 is the formation surface 110 of the subterranean formation 104. In the illustrated embodiment, a portion of the wellbore 100 has a casing 112 with cement 114 disposed between the casing 112 and the formation surface 110. The wellbore 100 has a production tubing 116 (through a production packer 118) for the flow of produced fluid including hydrocarbon to the surface 102. The hydrocarbon can be crude oil or natural gas that enters the wellbore 400 from the hydrocarbon reservoir formations 102. The produced fluid flowing upward through the production tubing 116 also includes water that enters the wellbore 100 from the water zone 108. The water from water zone 108 can cause production problems by generating emulsions, scale, and corrosion. The water from water zone 108 can also incur operational cost, because the water must typically be separated from the hydrocarbons.

In some embodiments, injecting the mixture includes pumping the mixture through the wellbore into the water zone. In some embodiments, the water zone includes a fracture. In some embodiments, the water zone includes a high-permeability streak.

Figure 2:
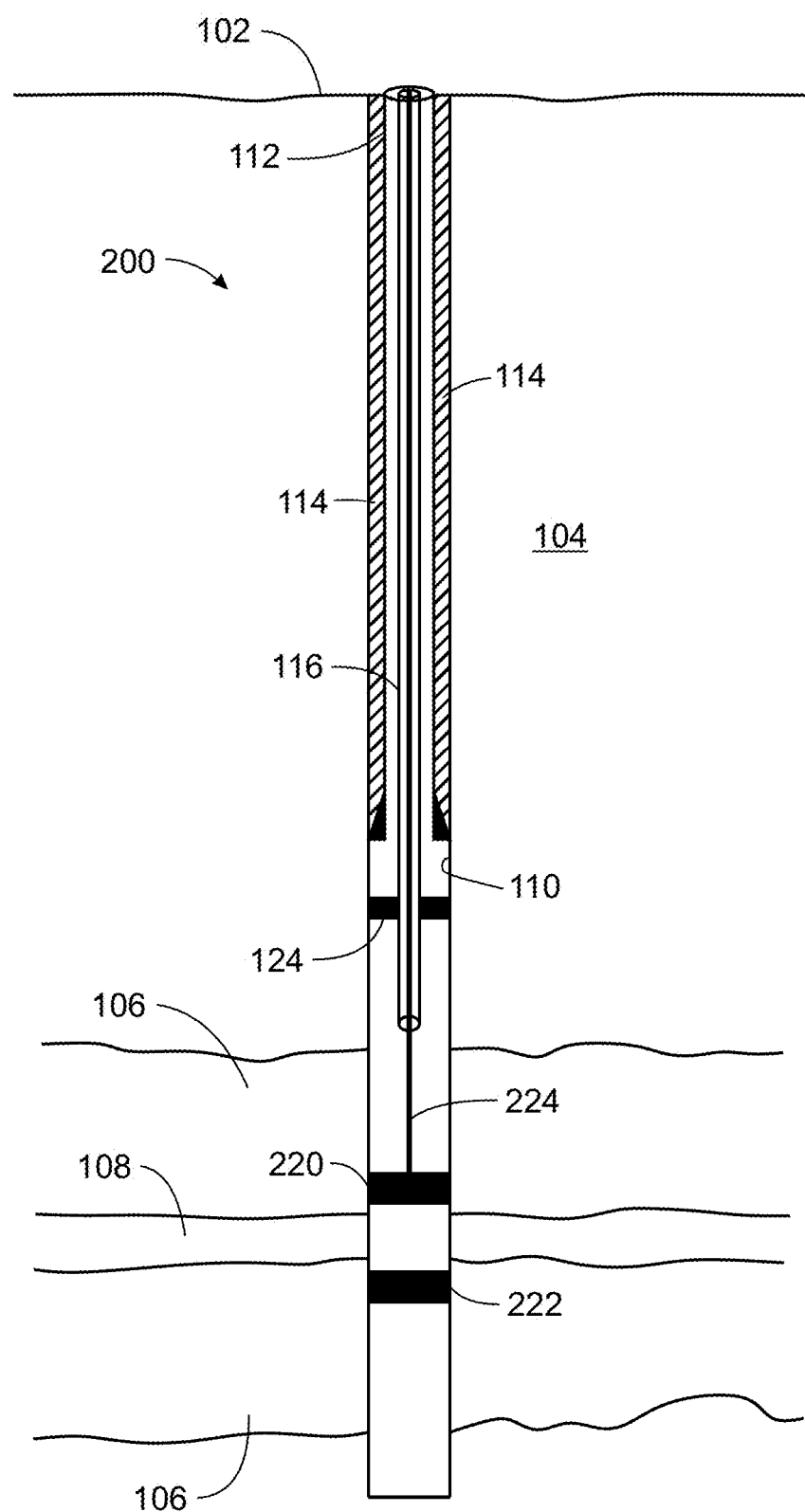
FIG. 2 is a schematic illustration of a wellbore formed through the earth surface into a subterranean formation.

In some embodiments, the method includes isolating the water zone before injecting the mixture. FIG. 2 is a schematic illustration of a wellbore 200 corresponding to wellbore 100 of FIG. 1, but further including upper packer 220 and lower packer 222 to mechanically isolate the water zone 108. In the illustrated embodiment, the mixture can be pumped through tubing 224, through a nozzle (not shown) in upper packer 220, into the isolated water zone 108, and then $CO_2$ can be pumped through tubing 224, through a nozzle (not shown) in upper packer 220, into the isolated water zone 108, to increase a viscosity of the mixture in the isolated water zone 108.

In some embodiments, isolating the water zone includes deploying a straddle packer into the wellbore. The straddle packer can include an upper expandable seal and a lower expandable seal to mechanically isolate the water zone, and nozzles to inject the mixture and the $CO_2$ into the isolated water zone to increase a viscosity of the mixture in the water zone. The straddle packer can be removed from the wellbore after injecting the $CO_2$.

In some embodiments, a total concentration of the anionic surfactant and the amine in the water zone after injecting the mixture is about 0.01 mol/L to about 2 mol/L, for example, about 0.01 mol/L to about 1.5 mol/L, about 0.01 mol/L to about 1 mol/L, about 0.01 mol/L to about 0.75 mol/L, about 0.01 mol/L to about 0.5 mol/L, about 0.05 mol/L to about 2 mol/L, about 0.05 mol/L to about 1.5 mol/L, about 0.05 mol/L to about 1 mol/L, about 0.05 mol/L to about 0.75 mol/L, about 0.05 mol/L to about 0.5 mol/L, about 0.1 mol/L to about 2 mol/L, about 0.1 mol/L to about 1.5 mol/L, about 0.1 mol/L to about 1 mol/L, about 0.1 mol/L to about 0.75 mol/L, about 0.1 mol/L to about 0.5 mol/L, about 0.25 mol/L to about 2 mol/L, about 0.25 mol/L to about 1.5 mol/L, about 0.25 mol/L to about 1 mol/L, or about 0.25 mol/L to about 0.75 mol/L. In some embodiments, a total concentration of the anionic surfactant and the amine in the water zone after injecting the mixture is about 0.25 mol/L, about 0.5 mol/L, about 0.75 mol/L, about 1 mol/L, about 1.25 mol/L, or about 1.5 mol/L.

Before injecting the $CO_2$, the mixture can be a low-viscosity mixture. For example, in some embodiments, the viscosity of the mixture before injecting $CO_2$ is less than about 0.01 Pa·s at a shear rate from about 0.1 to about 1000 $s^{-1}$, for example, less than about 0.005, less than about 0.004, less than about 0.003, or less than about 0.002 Pa·s at a shear rate from about 0.1 to about 1000 $s^{-1}$.

Injecting the $CO_2$ can increase the viscosity of the mixture by triggering gelation of the mixture, for example, to yield a $CO_2$-stabilized gel including water and a cross-linked network of the anionic surfactant and the amine. In some embodiments, injecting the $CO_2$ increases the viscosity of the mixture in the water zone to greater than 0.005 Pa·s at a shear rate from about 0.1 to about 1000 $s^{-1}$, for example, greater than about 0.006 Pa·s, greater than about 0.007 Pa·s, or greater than about 0.008 Pa·s at a shear rate from about 0.1 to about 1000 $s^{-1}$. In some embodiments, injecting the $CO_2$ increases the viscosity of the mixture in the water zone to greater than 0.1 Pa·s at a shear rate from about 0.1 to about 10 $s^{-1}$. In some embodiments, injecting the $CO_2$ increases the viscosity of the mixture in the water zone to greater than 0.5 Pa·s at a shear rate from about 0.1 to about 1 $s^{-1}$.

Figure 3:
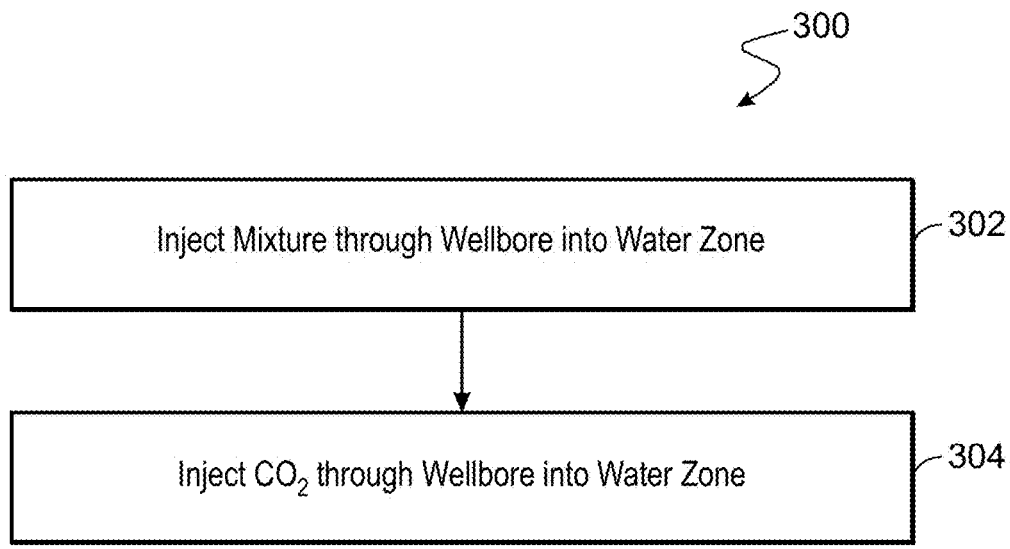
FIG. 3 is a block flow diagram of a method for treating a water zone of a subterranean formation.

FIG. 3 is a process flow diagram of a method 300 for treating a water zone of a subterranean formation. The method starts at block 302 with the injection of a mixture including an anionic surfactant and an amine through a wellbore into the water zone. At block 304 of the method, $CO_2$ is injected through the wellbore into the water zone to increase a viscosity of the mixture in the water zone.

Figure 4:
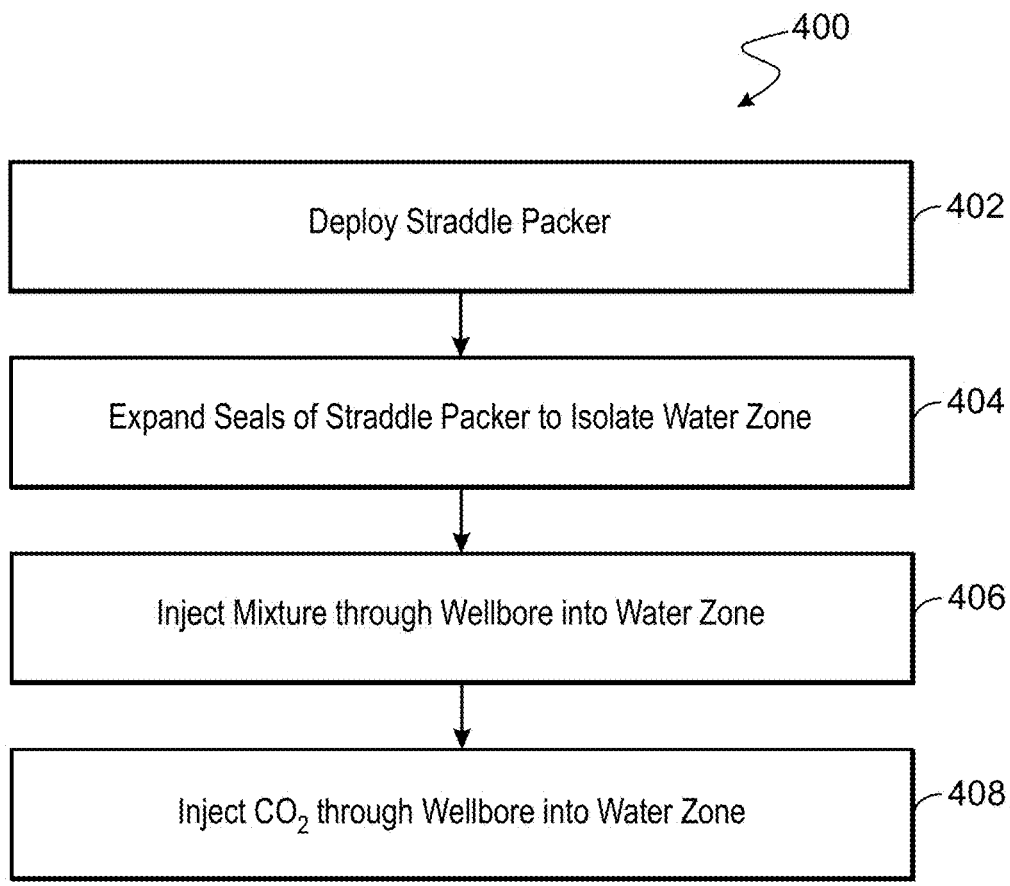
FIG. 4 is a block flow diagram of a method for treating a water zone of a subterranean formation.

FIG. 4 is a process flow diagram of a method 400 for treating a water zone of a subterranean formation. The method starts at block 402 with the deployment of a straddle packer into a wellbore in the subterranean formation. At block 404 of the method, an upper seal of the straddle packer is expanded above the water zone and a lower seal of the straddle packer is expanded below the water zone to mechanically isolate the water zone. At block 406 of the method, a mixture including an anionic surfactant and an amine is injected through the straddle packer into the water zone. At block 408 of the method, $CO_2$ is injected through the straddle packer into the water zone to increase a viscosity of the mixture in the water zone.

EXAMPLES

The invention is further described in the following examples, which do not limit the scope of the invention described in the claims.

Example 1. $CO_2$-Triggered Gelation of Anionic Surfactant-Amine Mixtures

Aqueous solutions of an anionic surfactant and an amine were prepared according to Table 1 to provide Mixtures 1-4.

TABLE 1

| Mixture | Anionic Surfactant | Amine |
|---|---|---|
| 1 | 0.25 mol/L sodium dodecyl sulfate (SDS) | 0.25 mol/L diethylenetriamine (DETA) |
| 2 | 0.25 mol/L sodium tetradecyl sulfate (STS) | 0.25 mol/L DETA |
| 3 | 0.25 mol/L sodium hexadecyl sulfate (SHS) | 0.25 mol/L DETA |
| 4 | 0.25 mol/L sodium octadecyl sulfate (SOS) | 0.25 mol/L DETA |

Figure 5A:
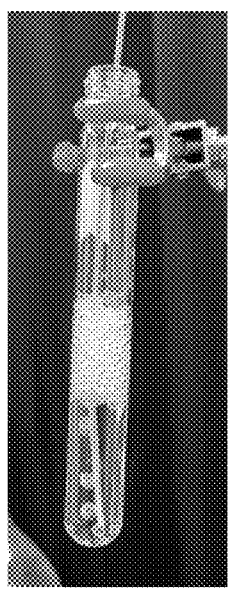
FIG. 5A is a photograph of a mixture of the present disclosure before exposure to $CO_2$.
Figure 5B:
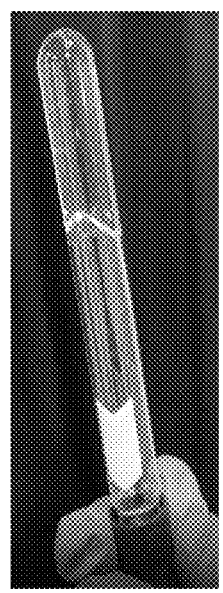
FIG. 5B is a photograph of a mixture of the present disclosure after exposure to $CO_2$.
Figure 6:
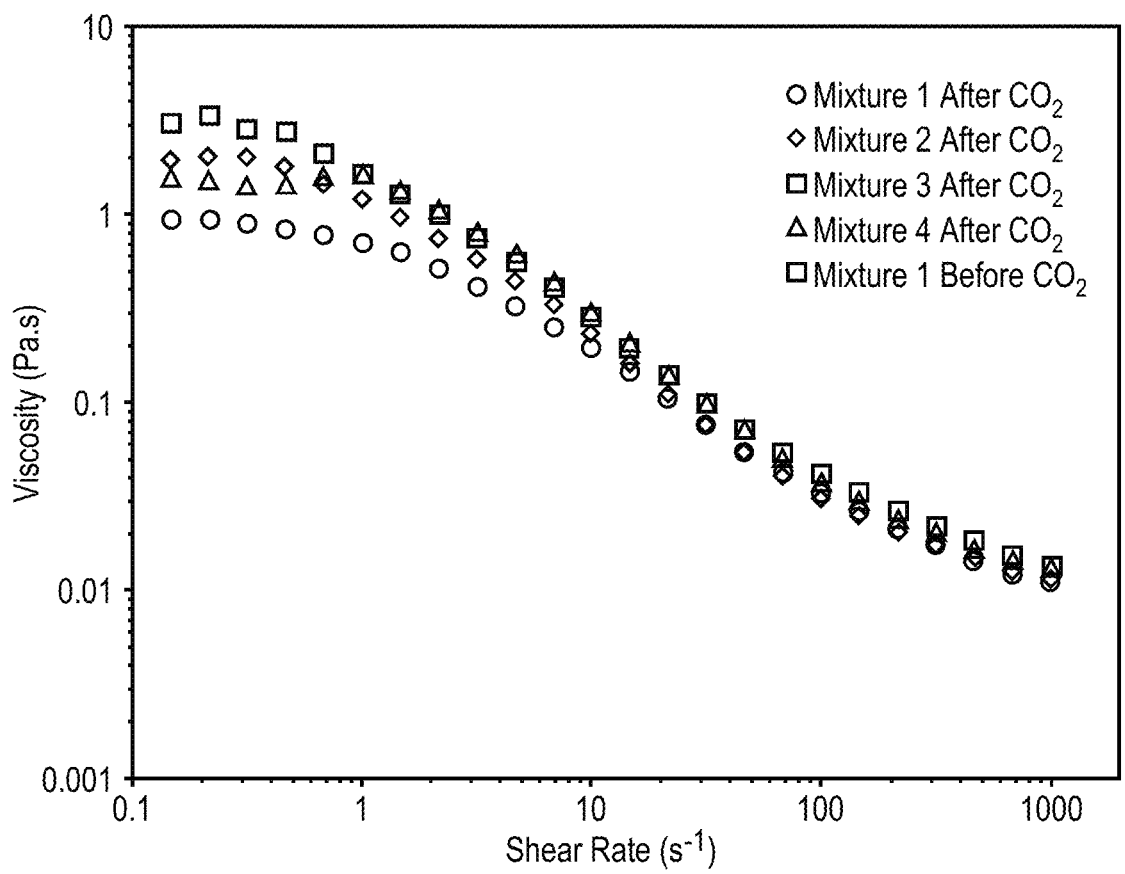
FIG. 6 is a graph comparing the viscosity of certain mixtures of the present disclosure before and after exposure to $CO_2$.

$CO_2$ was bubbled through each of Mixtures 1-4 to trigger gelation. FIGS. 5A-B are photographs showing Mixture 1 before (5A) and after (5B) exposure to $CO_2$. Rheological properties of the gelled samples were determined at 25° C.

using a TA controlled-stress rheometer (TA Instruments—Waters LLC) equipped with a setup of parallel plates. Rheological properties of Mixture 1 before $CO_2$ exposure were measured using a setup of double wall concentric cylinders. The shear rate ranged from 0.1 to 1000 $s^{-1}$. As shown in FIG. 6, injection of $CO_2$ significantly increased the viscosity of Mixtures 1-4.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating a water zone of a subterranean formation, the method comprising:
   injecting, through a wellbore into the water zone, a mixture comprising an anionic surfactant and an amine and having a viscosity of less than about 0.01 Pa·s at a shear rate from about 0.1 to about 1000 $s^{-1}$; and then
   injecting $CO_2$ through the wellbore into the water zone to increase a viscosity of the mixture in the water zone, wherein increasing the viscosity of the mixture reduces an influx of water from the water zone into the wellbore, and
   wherein the anionic surfactant comprises a compound of Formula I, Formula II, or Formula III:

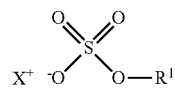
(I)

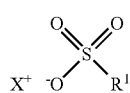
(II)

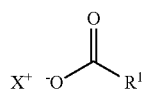
(III)

wherein:
$R^1$ is

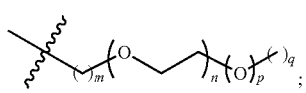

the sum of m and q is an integer from 12 to 22;
n is an integer from 0 to 10;
p is 0 or 1; and
$X^+$ is $Li^+$, $Na^+$, $K^+$, $Cs^+$, $Ag^+$, or $(R^A)_4N^+$, wherein
   each occurrence of R A is selected from H, $C_{1-6}$ alkyl, $C_{3-6}$ cycloalkyl, 4- to 7-membered heterocycloalkyl, $C_{6-10}$ aryl, and 5- to 10-membered heteroaryl;
   each $C_{1-6}$ alkyl is optionally substituted with 1-3 $R^B$ independently selected from $C_{3-6}$ cycloalkyl, 4- to 7-membered heterocycloalkyl, $C_{6-10}$ aryl, and 5- to 10-membered heteroaryl; and
   optionally, one or more instances of R A are taken together with the nitrogen atom to which they are attached to form a 4- to 7-membered heterocycloalkyl.

2. The method of claim 1, wherein
   n is from 1 to 10; and
   p is 1.

3. The method of claim 1, wherein n, p, and q are each 0.

4. The method of claim 1, wherein the anionic surfactant comprises sodium dodecyl sulfate, sodium tetradecyl sulfate, sodium hexadecyl sulfate, sodium octadecyl sulfate, or any combination thereof.

5. The method of claim 1, wherein the amine comprises an alkylene diamine, alkylene triamine, alkanolamine, or any combination thereof.

6. The method of claim 1, wherein the amine comprises a compound of Formula IV:

(IV)

wherein
   $R^2$ is selected from $C_{1-6}$ alkyl, $C_{3-6}$ cycloalkyl, 4- to 7-membered heterocycloalkyl, $C_{6-10}$ aryl, and 5- to 10-membered heteroaryl;
   $R^3$ and $R^4$ are each independently selected from —H, $C_{1-6}$ alkyl, $C_{3-6}$ cycloalkyl, 4- to 7-membered heterocycloalkyl, $C_{6-10}$ aryl, and 5- to 10-membered heteroaryl;
   each $C_{1-6}$ alkyl and $C_{6-10}$ aryl is optionally substituted with 1-3 $R^C$;
   each $R^C$ is independently selected from —OH and —$N(R^D)_2$; and
   each R D is independently selected from —H and $C_{1-4}$ alkyl.

7. The method of claim 6, wherein
   $R^2$ is $C_{1-6}$ alkyl or phenyl;
   $R^3$ and $R^4$ are each independently selected from —H, $C_{1-6}$ alkyl, and phenyl; and
   each $R^C$ is independently selected from —OH and —$NH_2$.

8. The method of claim 1, wherein the amine comprises diethylene triamine, bis(hexamethylene) triamine, 2-(dimethylamino) ethanol, or any combination thereof.

9. The method of claim 1, wherein the anionic surfactant and the amine are present in the mixture in a molar ratio of about 5:1 to about 1:5.

10. The method of claim 1, wherein the anionic surfactant and the amine are present in the mixture in a molar ratio of about 2:1 to about 1:2.

11. The method of claim 1, wherein a total concentration of the anionic surfactant and the amine in the water zone after injecting the mixture is about 0.01 mol/L to about 2 mol/L.

12. The method of claim 1, wherein a total concentration of the anionic surfactant and the amine in the water zone after injecting the mixture is about 0.1 mol/L to about 0.75 mol/L.

13. The method of claim 1, wherein the viscosity of the mixture before injecting $CO_2$ is less than about 0.005 Pa·s at a shear rate from about 0.1 to about 1000 s$^{-1}$.

14. The method of claim 1, wherein injecting $CO_2$ increases the viscosity of the mixture in the water zone to greater than about 0.01 Pa·s at a shear rate from about 0.1 to about 1000 s$^{-1}$.

15. The method of claim 1, wherein the water zone comprises a fracture or high-permeability streak.

16. The method of claim 1, wherein the method further comprises isolating the water zone before injecting the mixture.

17. The method of claim 16, wherein isolating the water zone comprises deploying a straddle packer into the wellbore.

18. A method of treating a water zone of a subterranean formation, the method comprising:
deploying a straddle packer into a wellbore in the subterranean formation;
expanding an upper seal of the straddle packer above the water zone and expanding a lower seal of the straddle packer below the water zone to mechanically isolate the water zone;
injecting a mixture comprising an anionic surfactant and an amine through the straddle packer into the water zone; and then
injecting $CO_2$ through the wellbore into the water zone to increase a viscosity of the mixture in the water zone,
wherein the anionic surfactant comprises a compound of Formula I, Formula II, or Formula III:

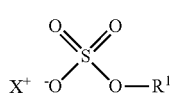
(I)

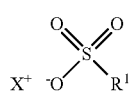
(II)

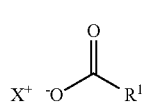
(III)

wherein:
$R^1$ is

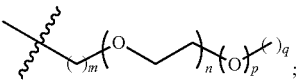;

the sum of m and q is an integer from 12 to 22;
n is an integer from 0 to 10;
p is 0 or 1; and
$X^+$ is $Li^+$, $Na^+$, $K^+$, $Cs^+$, $Ag^+$, or $(R^A)_4N^+$, wherein
each occurrence of R A is selected from H, $C_{1-6}$ alkyl, $C_{3-6}$ cycloalkyl, 4- to 7-membered heterocycloalkyl, $C_{6-10}$ aryl, and 5- to 10-membered heteroaryl;
each $C_{1-6}$ alkyl is optionally substituted with 1-3 $R^B$ independently selected from $C_{3-6}$ cycloalkyl, 4- to 7-membered heterocycloalkyl, $C_{6-10}$ aryl, and 5- to 10-membered heteroaryl; and
optionally, one or more instances of R A are taken together with the nitrogen atom to which they are attached to form a 4- to 7-membered heterocycloalkyl.

19. The method of claim 18, further comprising removing the straddle packer from the wellbore after injecting $CO_2$.

20. The method of claim 18, wherein
n is from 1 to 10; and
p is 1.

21. The method of claim 18, wherein n, p, and q are each 0.

22. The method of claim 18, wherein the amine comprises an alkylene diamine, alkylene triamine, alkanolamine, or any combination thereof.

23. The method of claim 18, wherein the amine comprises a compound of Formula IV:

(IV)

wherein
$R^2$ is selected from $C_{1-6}$ alkyl, $C_{3-6}$ cycloalkyl, 4- to 7-membered heterocycloalkyl, $C_{6-10}$ aryl, and 5- to 10-membered heteroaryl;
$R^3$ and $R^4$ are each independently selected from —H, $C_{1-6}$ alkyl, $C_{3-6}$ cycloalkyl, 4- to 7-membered heterocycloalkyl, $C_{6-10}$ aryl, and 5- to 10-membered heteroaryl;
each $C_{1-6}$ alkyl and $C_{6-10}$ aryl is optionally substituted with 1-3 $R^C$;
each $R^C$ is independently selected from —OH and —N(R$^D$)$_2$; and
each R D is independently selected from —H and $C_{1-4}$ alkyl.

24. The method of claim 23, wherein
$R^2$ is $C_{1-6}$ alkyl or phenyl;
$R^3$ and $R^4$ are each independently selected from —H, $C_{1-6}$ alkyl, and phenyl; and
each $R^C$ is independently selected from —OH and —NH$_2$.

25. The method of claim 18, wherein the amine comprises diethylene triamine, bis(hexamethylene) triamine, 2-(dimethylamino) ethanol, or any combination thereof.

* * * * *

UNITED STATES PATENT AND TRADEMARK OFFICE
CERTIFICATE OF CORRECTION

| | | |
|---|---|---|
| PATENT NO. | : 11,993,747 B1 | Page 1 of 1 |
| APPLICATION NO. | : 18/178979 | |
| DATED | : May 28, 2024 | |
| INVENTOR(S) | : Zuhair Al-Yousif et al. | |

It is certified that error appears in the above-identified patent and that said Letters Patent is hereby corrected as shown below:

In the Claims

In Column 14, Line 3, Claim 1, please replace "R A" with -- $R^A$ --

In Column 14, Line 10, Claim 1, please replace "R A" with -- $R^A$ --

In Column 14, Line 47, Claim 6, please replace "R D" with -- $R^D$ --

In Column 16, Line 13, Claim 18, please replace "R A" with -- $R^A$ --

In Column 16, Line 20, Claim 18, please replace "R A" with -- $R^A$ --

In Column 16, Line 53, Claim 23, please replace "R D" with -- $R^D$ --

Signed and Sealed this
Twentieth Day of August, 2024

Katherine Kelly Vidal
*Director of the United States Patent and Trademark Office*